(12) United States Patent
Igualada et al.

(10) Patent No.: US 9,873,772 B2
(45) Date of Patent: Jan. 23, 2018

(54) POLYMER FOAMS

(71) Applicant: A. SCHULMAN, INC., Fairlawn, OH (US)

(72) Inventors: Juan Antonio Igualada, Castellon (ES); Jose Luis Feijoo, Villarreal (ES)

(73) Assignee: A. SCHULMAN, INC., Fairlawn, OH (US)

( * ) Notice: Subject to any disclaimer, the term of this patent is extended or adjusted under 35 U.S.C. 154(b) by 0 days.

(21) Appl. No.: 14/653,034

(22) PCT Filed: Dec. 16, 2013

(86) PCT No.: PCT/US2013/075270
§ 371 (c)(1),
(2) Date: Jun. 17, 2015

(87) PCT Pub. No.: WO2014/099721
PCT Pub. Date: Jun. 26, 2014

(65) Prior Publication Data
US 2015/0337103 A1    Nov. 26, 2015

Related U.S. Application Data

(60) Provisional application No. 61/737,874, filed on Dec. 17, 2012.

(51) Int. Cl.
| | |
|---|---|
| C08J 9/35 | (2006.01) |
| C08J 9/12 | (2006.01) |
| C08J 9/00 | (2006.01) |
| C08J 3/22 | (2006.01) |
| C08K 3/34 | (2006.01) |
| C08J 9/14 | (2006.01) |

(52) U.S. Cl.
CPC ............ *C08J 9/35* (2013.01); *C08J 3/226* (2013.01); *C08J 9/0019* (2013.01); *C08J 9/0061* (2013.01); *C08J 9/0066* (2013.01); *C08J 9/0076* (2013.01); *C08J 9/0095* (2013.01); *C08J 9/122* (2013.01); *C08J 9/127* (2013.01); *C08J 9/142* (2013.01); *C08J 9/144* (2013.01); *C08J 9/149* (2013.01); *C08K 3/346* (2013.01); *C08J 2201/024* (2013.01); *C08J 2203/06* (2013.01); *C08J 2203/12* (2013.01); *C08J 2203/142* (2013.01); *C08J 2203/202* (2013.01); *C08J 2205/046* (2013.01); *C08J 2325/06* (2013.01); *C08J 2375/04* (2013.01); *C08J 2423/08* (2013.01); *C08J 2425/08* (2013.01)

(58) Field of Classification Search
CPC .......... C08J 9/35; C08J 9/0042; C08J 9/0095; C08K 3/346
See application file for complete search history.

(56) References Cited

U.S. PATENT DOCUMENTS

| | | |
|---|---|---|
| 3,015,634 A | 1/1962 | Ferrigno |
| 5,302,634 A | 4/1994 | Mushovic |
| 6,344,509 B1* | 2/2002 | Mizutani ............... C08K 5/103 524/13 |
| 6,797,734 B2 | 9/2004 | Iwamoto et al. |
| 2003/0130364 A1 | 7/2003 | Vo et al. |
| 2003/0205832 A1 | 11/2003 | Lee et al. |
| 2004/0220289 A1* | 11/2004 | Saito ..................... C08J 9/122 521/50 |
| 2005/0112356 A1 | 5/2005 | Rynd et al. |
| 2005/0119372 A1 | 6/2005 | Czaplicki et al. |
| 2006/0205856 A1* | 9/2006 | Williamson ........... C08K 3/346 524/445 |
| 2006/0264523 A1 | 11/2006 | Lee et al. |
| 2007/0155846 A1* | 7/2007 | Muyldermans ........ C08J 9/0061 521/134 |
| 2007/0179205 A1 | 8/2007 | Loh et al. |
| 2008/0293839 A1 | 11/2008 | Stobby |
| 2009/0149560 A1 | 6/2009 | Miyagawa et al. |
| 2009/0192254 A1 | 7/2009 | Williamson et al. |
| 2009/0314446 A1 | 12/2009 | Lu et al. |
| 2010/0068330 A1* | 3/2010 | Martinoni ........... B29C 67/0077 425/542 |
| 2010/0298456 A1* | 11/2010 | Nakajima ............. C08J 9/0061 521/134 |
| 2011/0250421 A1* | 10/2011 | Okuda ..................... B29C 44/50 428/220 |
| 2011/0306693 A1 | 12/2011 | Bosnyak et al. |
| 2012/0149793 A1 | 6/2012 | Stobby |
| 2012/0256119 A1* | 10/2012 | Bouvier ............... C10M 125/26 252/68 |

FOREIGN PATENT DOCUMENTS

| | | |
|---|---|---|
| EP | 0152491 A1 | 8/1985 |
| GB | 1403808 A | 8/1975 |
| JP | 11-218290 A | 8/1999 |
| JP | 2002-146079 A | 5/2002 |
| JP | 2003-171516 A | 6/2003 |
| JP | 2007-512425 A | 5/2007 |
| WO | 03/059997 A1 | 7/2003 |
| WO | 2006/005901 A1 | 1/2006 |
| WO | WO 2009057825 A1 * | 5/2009 ............ C08J 9/0061 |
| WO | 2010/081918 A1 | 7/2010 |

OTHER PUBLICATIONS

International Search Report dated Sep. 21, 2011; PCT/US11/36162.
International Search Report dated May 7, 2014: PCT/US2013/075270.
USPTO NFOA dated Mar. 26, 2015 in connection with U.S. Appl. No. 13/811,402.

* cited by examiner

*Primary Examiner* — Kara B Boyle
(74) *Attorney, Agent, or Firm* — Ladas & Parry LLP

(57) ABSTRACT

Monomodal foamed polymeric compositions containing clay nucleating agents are described. The clays are preferably sepiolite, palygorskite/attapulgite, or combinations thereof. Also described are processes for forming the foamed compositions.

17 Claims, 4 Drawing Sheets

POLYMER FOAMS

PRIORITY

This application claims priority to U.S. Provisional Application No. 61/737,874 filed Dec. 17, 2012 which is incorporated herein by reference.

FIELD OF INVENTION

The present invention relates to polymeric foams, methods of forming the foams, and products utilizing the foams. More particularly, the present invention relates to polymeric composite monomodal foams with improved physical and mechanical properties resulting from the use of certain particles as nucleating and reinforcing agents.

BACKGROUND OF THE INVENTION

Foamed plastics exhibit reduced apparent densities due to the presence of numerous cells dispersed throughout the mass of the polymer. Rigid foams that exhibit densities greater than about 320 kg/m$^3$ are typically referred to as structural foams, and are well known in the art. Structural foams are commonly used in various aspects of manufacturing molded articles in which low density polymeric materials are desirable.

Cellular polymers and plastics are made by a variety of methods typically involving steps of cell initiation, cell growth and cell stabilization. Structural foams having an integral skin, cellular core, and a high strength to weight ratio, are made by several processes, including injection molding and extrusion molding. The particular process that is used is selected based upon requirements of the end products.

Because of the favorable combination of properties, price, and ease of processing, styrene polymers, and especially polystyrene, are widely used in preparing foam sheets, films and slabs for such divergent end uses as packaging, pipe and tubing, construction and insulation. For example, expanded styrene polymers such as polystyrene are widely used in the insulation of freezers, coolers, truck bodies, railroad cars, farm buildings, roof decks and residential housing. Styrene polymer foams are also used as a core material for structural sandwich panels used in refrigerated truck bodies, mobile homes and recreational vehicles. Extruded polystyrene foams (XPS) are widely used to insulate buildings and components of buildings. Extruded polystyrene foams are also used in various food packaging applications.

Initiation of cell formation and promotion of cells of a given size are controlled by nucleation agents included in the polymer composition. The nature of cell control agents added to polymer compositions influences the mechanical stability of the foamed structure by changing the physical properties of the plastic phase and by creating discontinuities in the plastic phase. These discontinuities allow blowing agent(s) used in cell formation to diffuse from the cells to the surrounding material. Typically, the resulting cells provide for a lightweight molded article, but do so at the expense of impact resistance. For example, nucleation agents often promote crystalline structures within the cooled polymer, which reduce impact resistance. Mineral fillers may be added to provide a large number of nucleation sites, but such fillers tend to serve as stress concentrators, thereby promoting crack formation and decreasing the impact resistance of the resulting molded articles. Typically, the reduced strength of structural foams may be at least partially offset by increasing the wall thickness of molded articles. However, increasing wall thickness requires greater amounts of raw materials per unit molded, thereby increasing the cost of production.

Flame retardant (FR) additives are commonly added to extruded polymer foam products that are used in construction and automotive applications. The presence of the flame retardant additive allows the foam to pass standard fire tests as are required in various jurisdictions. Various brominated compounds having low molecular weights, typically less than about 1000 g/mol, are used as flame retardant additives in many of these foam products. Many of these compounds, such as hexabromocyclododecane, are under regulatory and public pressures that may lead to restrictions on their use, and so a strong incentive exists to find a replacement for such brominated compounds.

An alternative flame retardant additive for extruded polymer foams should be capable of allowing the foam to pass standard fire tests when incorporated into the foam at reasonably low levels. Because extruded foams are processed at elevated temperatures, it is important that the flame retardant additive be thermally stable at the temperature conditions used in the extrusion process. For some foams such as polystyrene and styrene copolymer foams, these temperatures are typically 180° C. or higher. Several problems are encountered if the flame retardant additive decomposes during the extrusion process. These problems include loss of flame retardant agent and therefore loss of flame retardant properties, and the generation of decomposition products (such as HBr) that are often corrosive and therefore potentially dangerous to humans and harmful to operating equipment. Therefore, the flame retardant agent should not cause a significant loss of desirable physical properties in the polymer. It is also preferable that the flame retardant additive has low toxicity and is not highly bioavailable.

The incorporation of flame retardant additives into thermoplastic polymer compositions can also negatively impact the strength of the resulting foam product. For example, in foamed styrene polymers containing halogenated additives, the degree of bromine loading must be relatively low to avoid detrimentally impacting the structural qualities and skin quality of the foam. For example, when utilizing hexabromocyclododecane (HBCD) as a fire retardant in a styrene polymer foam, a high level of HBCD is required in order to meet fire retardancy requirements, particularly the stringent European fire retardancy tests. The incorporation of HBCD into the styrene polymer foam at these levels may result in poor skin quality and a high degree of degradation of the styrene polymer and of the reground material in an extrusion process due to excessive heating. Excessive heat and degradation bring about a reduction of the molecular weight of the styrene polymer foam and of the reground styrene polymer and a resultant drop in physical and mechanical properties.

Therefore, a need exists in the art for fire retardant styrene polymer foams which utilize halogenated fire retardants and particularly hexabromocyclododecane (HBCD) as the fire retardant, which meet fire retardancy requirements, and which are amenable to extrusion processes, but which do not exhibit poor structural qualities and/or skin qualities.

SUMMARY OF THE INVENTION

The difficulties and drawbacks associated with previously known foams, compositions, methods, and foamed products are addressed in the present compositions and methods relating to polymer composite foams.

In one aspect, the present invention provides a monomodal polymer foam composition comprising from about 0.01% to about 40% of sepiolite-type clays dispersed in a polymeric matrix comprising about 60% to about 99.9% of at least one of i) a thermoplastic polymer and ii) a thermoset polymer, wherein when the polymeric matrix comprises i) a thermoplastic polymer, then a blowing agent used to form the composition is substantially free of water.

In another aspect, the present invention provides a foamable polymer composition comprising a polymeric matrix having an effective amount of at least one sepiolite-type clay dispersed therein. The polymeric matrix comprises at least one of i) a thermoplastic polymer and ii) a thermoset polymer, and wherein when the polymeric matrix comprises i) a thermoplastic polymer, then a blowing agent used to form the composition into a foam is substantially free of water.

In yet another aspect, the invention provides a method of forming a monomodal polymeric foam. The method comprises incorporating an effective amount of sepiolite-type clay particles and at least one blowing agent, into a polymer matrix comprising at least one of i) a thermoplastic polymer and ii) a thermoset polymer and processing to thereby produce the monomodal polymeric, foam, wherein when the polymeric matrix comprises i) a thermoplastic polymer, then a blowing agent is substantially free of water.

In still another aspect, the present invention provides a concentrate composition used to form a polymer foam. The concentrate composition comprises at least one flowable carrier comprising at least one of i) a thermoplastic polymer and ii) a thermoset polymer, and one or more sepiolite-type clays dispersed in the carrier. The sepiolite-type clay is present in an amount of from about 5% to about 70% by weight of the polymer carrier. When the at least one carrier comprises i) a thermoplastic polymer, then a blowing agent used to form the polymer foam is substantially free of water.

And in yet another aspect, the invention provides a method of forming a concentrate composition used to form a polymer foam, the method comprising providing a flowable carrier comprising at least one of i) a thermoplastic polymer and ii) a thermoset polymer and dispersing sepiolite-type clays in the carrier to thereby form the concentrate composition. The sepiolite-type clay is present in an amount of from about 5% to about 70% by weight of the polymer carrier. When the flowable carrier comprises i) a thermoplastic polymer, then a blowing agent used to form the polymer foam is substantially free of water In yet another aspect, the invention provides a method of forming a monomodal polymeric foam. The method comprises forming a concentrate composition including at least one carrier comprising at least one of i) a thermoplastic polymer and ii) a thermoset polymer and dispersed therein from about 5% to about 70% by weight of at least one sepiolite-type clay; incorporating an effective amount of the concentrate composition into a polymer matrix comprising at least one of i) a thermoplastic polymer and ii) a thermoset polymer; introducing at least one blowing agent into the polymer matrix and incorporated concentrate composition; and processing the polymer matrix with the concentrate composition and at least one blowing agent, to thereby produce the monomodal polymeric foam, wherein when the at least one carrier or the polymer matrix comprise i) a thermoplastic polymer, then a blowing agent is substantially free of water.

All compositional percentages are by weight.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
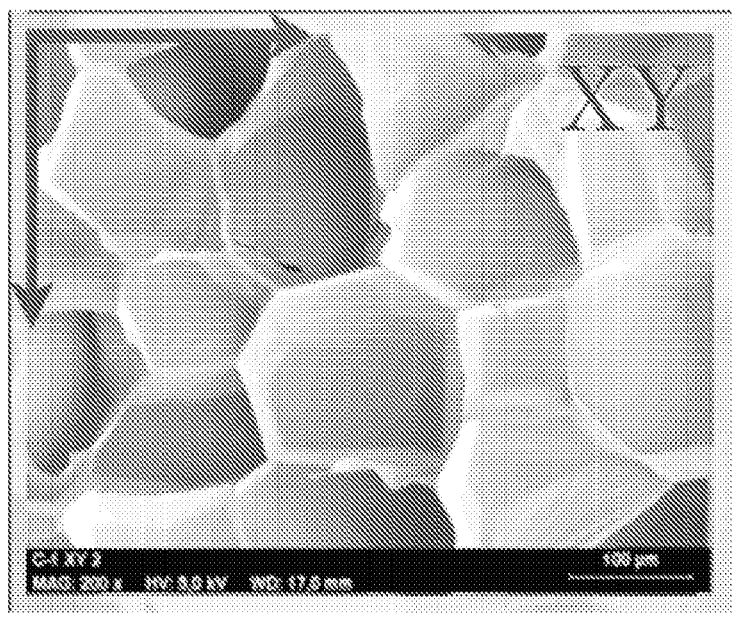
FIG. 1 is a scanning electron micrograph (SEM) of an extruded polystyrene foam formed using 0.6% talc by weight as a nucleating agent. Magnification is 200 times.

The present invention provides compositions of polymeric foams with monomodal cell size, and containing nucleating agents. The compositions use fibrous or pseudolaminar type clays as the nucleating agents, specifically sepiolite-type clays are used, and generally include sepiolite and attapulgite (palygorskite) clays and mixtures thereof. These sepiolite-type clays provide much higher efficiency than traditional nucleating agents such as talc and, contrary to prior-art clays, do not need to be organically modified in order to obtain a reasonable level of dispersion. The compositions of the invention provide an improvement in physical and/or mechanical properties of the resulting monomodal foamed products. The preferred sepiolite-type clays as described herein also exhibit a synergistic effect with flame retardants and with blowing agent systems containing $CO_2$ and water. In a particularly preferred aspect, the invention provides a concentrated composition or "masterbatch" having relatively high concentrations of clay nucleating agents. The present invention also provides methods of forming the compositions, and producing foamed products from the compositions.

A foam is "monomodal", has cells with "monomodal cell size", has a "highly uniform cell structure", or has "uniform cell size distribution" if a plot of percentage of total number of cells versus cell size reveals one peak.

Clay Nucleating Agents

In many industrial foaming operations, it is important to use nucleating agents, in order to control the final foam morphology. Traditional nucleating agents are generally formed from talc, which is inexpensive, efficient, easy to disperse in the polymer and in large amounts to form masterbatches. According to classical nucleation theory, in the foaming process, the heterogeneous nucleation rate is a function of the concentration of heterogeneous nucleation sites, which are typically defined as the number of particles per cubic centimeter. Therefore, particle concentration is important because this factor sets the upper theoretical limit for heterogeneous nucleation. In the foaming of polystyrene (PS), it has been reported that organoclays are more efficient as compared to talc, thereby suggesting an improved effect from using exfoliated clays with respect to talc and intercalated clays. Other artisans have investigated the foaming of composites based on PS and poly(methylmethacrylate), and have reported that cell morphology can be manipulated by adjusting the interactions between the polymer, the clay surface, and the blowing agent.

Compared to conventional micron sized particles used in most foaming processes, nanometer sized clay particles offer extremely fine dimensions, large surface area and intimate contact between particles and polymer matrix. Thus, nano sized particles not only significantly affect cell nucleation and growth, but also provide benefits to the structure and properties of the resulting polymer.

An important factor contributing to the properties of different clay minerals is their molecular structure. Most clay minerals are based on two types of structure, the silica tetrahedral sheet and the alumina-magnesia octahedral sheet. In both of these structures, the tetrahedral and octahedral structural units can be joined or stacked in several configurations of composite layers, producing various hydrated aluminosilicates that form layer-lattice minerals with a plate-like shape (e.g. kaolinite, smectite, illite and vermiculite) or chain-lattice minerals with an elongate shape (e.g. palygorskite and sepiolite). The layered lattice structures are grouped as 1:1 layer structures containing one tetrahedral sheet linked with one octahedral sheet, and 2:1 layer structures with two tetrahedral sheets linked with one octahedral sheet. Less common clay minerals are either amorphous, i.e. non-crystalline such as the clay mineral allophane, or have a structure based on double tetrahedral chains similar to that of amphibole minerals.

Clay minerals may be classified into eight main groups on the basis of variations in structure and composition: (1) kaolinite, (2) smectite, (3) vermiculite, (4) illite, (5) pyrophyllite, (6) chlorite, (7) palygorskite-sepiolite, and (8) allophane. Each of these groups and their layer structures are noted below in Table 1.

TABLE 1

Classification of Clay Minerals

CRYSTALLINE
   1:1 layer type
     Equidimensional
      Kaolinite group (kaolinite, dickite, nacrite)
     Elongate
      Kaolinite group (halloysite)
   2:1 layer type
     Expanding lattice
      Equidimensional
       Smectite group (e.g. smectite)
       Vermiculite group
      Elongate
       Smectite group (e.g. nontronite, saponite)
     Non-expanding lattice
      Illite group (micas)
      Pyrophyllite (talc) group
      Chlorite group
   2:1 chain-structure types
     Palygorskite group (palygorskite, sepiolite)
AMORPHOUS
   Allophane group The vast majority of clays used in polymeric composites are based on the naturally occurring smectite clays. Smectite group clays have a 2:1 sheet structure and include the dioctahedral minerals smectite (also known as montmorillonite), beidellite and nontronite, and the trioctahedral minerals hectorite (Li—Mg-smectite) and saponite (Mg-smectite; also known as bowlingite and soapstone). Smectites are the principal constituents of bentonite and fuller's earth. The particles are plate-shaped with an average diameter of approximately one micrometer.

The montmorillonites are a group of clays in which isomorphous substitution of some of the octahedral aluminum(III) atoms by magnesium(II) or iron(II) atoms has taken place, with the result that the sheet retains a residual negative charge. In the naturally occurring form, this charge is balanced by the introduction of interlamellar cations such as $Na^+$ or $Ca^{2+}$, some cations also occupying broken edge sites. Such smectite clays have the additional property of swelling in the presence of either water or a host of organic molecules, when the interlamellar distance between the sheets increases to accommodate the guest molecules. These are thixotropic and possess high cation-exchange capacities.

In contrast to layered silicates, such as montmorillonite, sepiolite has not been extensively employed as a filler in the preparation of polymer-clay composites. The palygorskite-sepiolite clay mineral group has received far less attention than other major clay minerals. This neglect partly reflects the fact that these clay minerals are less common than the layered phyllosilicates. Difficulties in identification, particularly during routine X-ray diffraction (XRD) identification procedures for geological surveys, may also have contributed to the scarcity of information available for this clay mineral group.

The palygorskite-sepiolite group (formerly hormite group) includes the minerals palygorskite, also known as attapulgite, and sepiolite. These minerals belong to the group of pseudolaminar silicates characterized in that the shape of their particles is not laminar but instead acicular, in the form of microfibers with an average length of 1 to 2 microns, and which, in the case of sepiolite, is found for example in the Vallecas-Vicalvaro deposit (Madrid, Spain) and in Amargosa Valley (Nevada, United States of America) and in the case of palygorskite in, for example, the United States. Sepiolite and palygorskite are included in the phyllosilicate group because they contain a continuous two-dimensional tetrahedral sheet of composition $Si_2O_5$. They differ, however, from the other layered silicates such as montmorillomite because they lack continuous octahedral sheets. The structures of sepiolite and palygorskite are alike and can be regarded as consisting of narrow strips or ribbons of 2:1 layers that are linked stepwise at the corners.

Sepiolite and palygorskite are also unique in that they exhibit microfibrous morphology with two structural dimensions (a,b) in the nanometric range. Thus, their structure can be considered as nano two dimensional or as periodically referred to herein as "2-nano-D" materials. Smectites such as montmorillonite are, however, nano one dimensional or "1-nano-D" materials.

The structure of sepiolite and palygorskite incorporates channels of approximately 3.7 Å by 10.6 Å and features a high surface area (sepiolite has the highest surface area of all the clay minerals), porosity (micropore volume of approximately 0.4 $cm^3/g$), surface charge and cation exchange capacities, resulting in excellent sorptive, colloidal and thixotropic (gelling) properties in water. Interlaced disoriented fibers aggregate into a massive stone so porous that it floats on water. This structure produces a micro-sponge that is naturally designed to absorb water and other polar liquids in percentages of more than 100% its own weight. Palygorskite and sepiolite can be used for the formation of hybrid materials resulting from the intercalation in their channels of relatively small organic molecules such as pyridine, methanol, ethanol or acetone.

According to the formula of sepiolite, $Mg_4Si_6O_{15}(OH)_2 \cdot 6H_2O$, three types of water or hydroxyl units occur in sepiolite—weakly bound channel water (zeolitic water), four $H_2O$ molecules attached to bordering octahedral cations in the channels (crystal water), and hydroxyl groups at the center of the 2:1 ribbons (constitution water). Zeolitic water is lost upon heating to about 100° C. Crystal water is lost between 250° C. and 400° C., and constitution water is lost from 550° C. to 800° C.

Of the total water, about 60 percent by weight is lost upon heating to a temperature of 250° C. This process is reversible. When sepiolite is heated above 350° C., the crystal structure is eventually changed and about 25 percent more of the total water content by weight is lost. This process is irreversible and is finished at approximately 400° C. The mineral, after such heating, still contains about 15 percent of the entire water content by weight which is driven off by heating above 700° C. By this process, the lattice is completely destroyed. In some aspects of the present subject matter, it is preferred that the sepiolite-type clays used as nucleating agents are dry. By "dry" it is meant that the sepiolite-type clays are not wetted or pre-wetted with water and have a water content of about 15% or less by weight when added to the polymer matrix. In other aspects of the present subject matter, it is preferred that the sepiolite-type clays used as nucleating agents are pre-wetted with water. Pre-wetted sepiolite-type clays are discussed in further detail herein.

Although clays have a high aspect ratio, they typically require special treatment to separate the layers and achieve exfoliation. One such manner of achieving exfoliated layers is to incorporate an organic modifier in the clay. Layered nano-materials, such as organo-montmorillonite, typically contain approximately from 30 to 40 weight percent of low molecular weight organic modifiers. These modifiers are used to convert the clay surface from hydrophilic to hydrophobic, and to make the clay particles compatible with the polymer matrix for dispersion. Previous attempts to form an intercalated or exfoliated microstructure of a clay-polymer matrix/composite have utilized modifiers such as methacryloyloxyethylhexadecyl-dimethyl ammoniums and methyl tallow bis-2-hydroxyethyl quaternary ammonia salts (e.g., Closite 20A, commercially available from Southern Clay Products Inc. of Gonzales, Tex.). It is well known to those skilled in the art that these surface modifiers are considered fire hazards based on industry fire tests, such as oxygen index and flame surface spread rates.

Consequently, although not limited to such by the present invention, the use of modifier-free clays would reduce the burning characteristics of polymer foams such as melting and dripping and assist in the increased formation of char, which helps to meet stringent fire requirements.

Unlike intercalated nanocomposites in which polymer chain penetration is limited and the major contact area is the outer surface of the tactoids, the extremely fine dimensions and large surface area of sepiolite and palygorskite particles provide much more intimate contact between the particles, polymer matrix, and blowing agent. Furthermore, a significantly higher effective particle concentration can be achieved at a low nominal particle concentration.

Yet another significant advantage in using the preferred sepiolite-type clays described herein is that conventional exfoliation processes are not necessary. That is, many clay-based agents typically require one or more exfoliation processes in which bundles or aggregates in the clay material are separated into nanometer size particles. It has been surprisingly discovered that exfoliation is not necessary for sepiolite and palygorskite due to its fibrous structure. This is an important advantage over laminar clays which typically require chemical modification and subsequent exfoliation.

Accordingly, the preferred clay used in forming the polymeric composite foam belongs to the pseudolaminar clay family. It is more preferred that the pseudolaminar clay is a sepiolite-type clay and selected from the group consisting of sepiolite, palygorskite/attapulgite, and combinations thereof. Table 2 set forth below, lists details of the preferred embodiment clays sepiolite and palygorskite in accordance with the present invention as compared to smectite clay.

TABLE 2

Characteristics of Preferred Embodiment Clays and Smectite Clays

| | Formula | Dana 8$^{th}$ ed. classification | Structure |
|---|---|---|---|
| Smectite | $(Na,Ca)_{0.33}(Al,Mg)_2Si_4O_{10}(OH)_2 \cdot nH_2O$ | 71.3.1a.2 phyllosilicate sheets of 6-membered rings with 2:1 clays | Sheet of alumina octrahedrons sandwiched between two sheets of oriented SiO2 tetrahedrons whose tips point toward the alumina sheet |
| Palygorskite | $(MgAl)_2Si_4O_{10}(OH) \cdot 4H_2O$ | 74.3.1b.1 phyllosilicates with modulated layers with joined strips | Silica tetrahedrons in double chains linked through oxygens at their longitudinal edges; the tips of the tetrahedrons of successive chains point in opposite directions |
| Sepiolite | $Mg_4Si_6O_{15}(OH)_2 \cdot 6H_2O$ | 74.3.1b.1 phyllosilicates with modulated layers with joined strips | Similar to palygorskite, except that three pyroxene chains are linked to form two amphibole chains |

| | Crystal symmetry | Zeolitic channels | Habit | Swelling/ Flocculating | Exfoliation needed |
|---|---|---|---|---|---|
| Smectite | monoclinic | No | Massive, very fine grained | Yes | Yes |

TABLE 2-continued

Characteristics of Preferred Embodiment Clays and Smectite Clays

| | | | | | |
|---|---|---|---|---|---|
| Palygorskite | orthorhombic | Yes | Lath shaped, elongated, in bundles many microns long, 60-100 Å wide | No | No |
| Sepiolite | orthorhombic | Yes | Massive; fine fibrous. Shorter and thicker than palygorskite | No | No |

Figure 2:
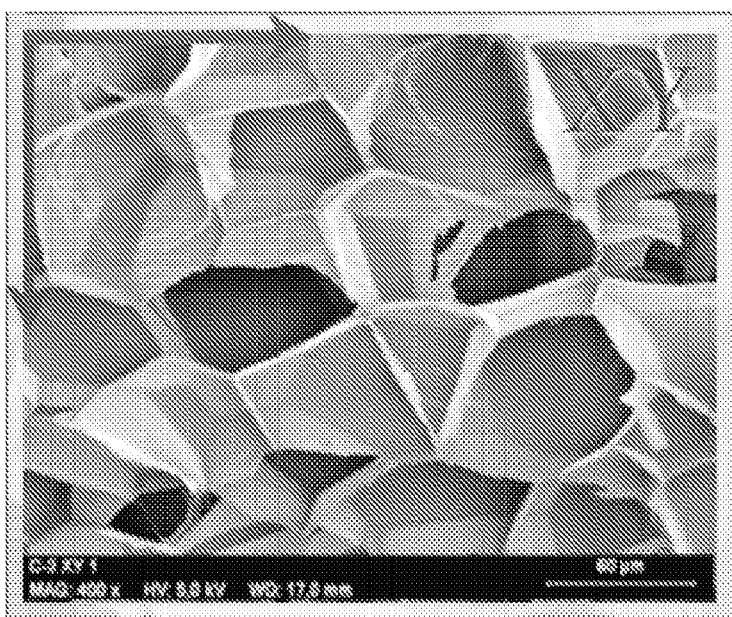
FIG. 2 is a scanning electron micrograph (SEM) of an extruded polystyrene foam formed using 0.2% sepiolite by weight as a nucleating agent. Magnification is 400 times.
Figure 3:
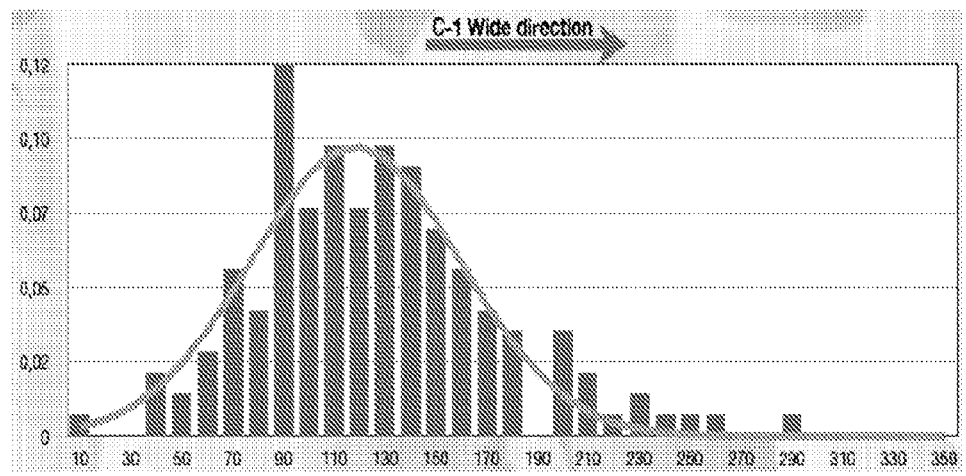
FIG. 3 is a graph showing the cell size distribution of the foam in FIG. 1.
Figure 4:
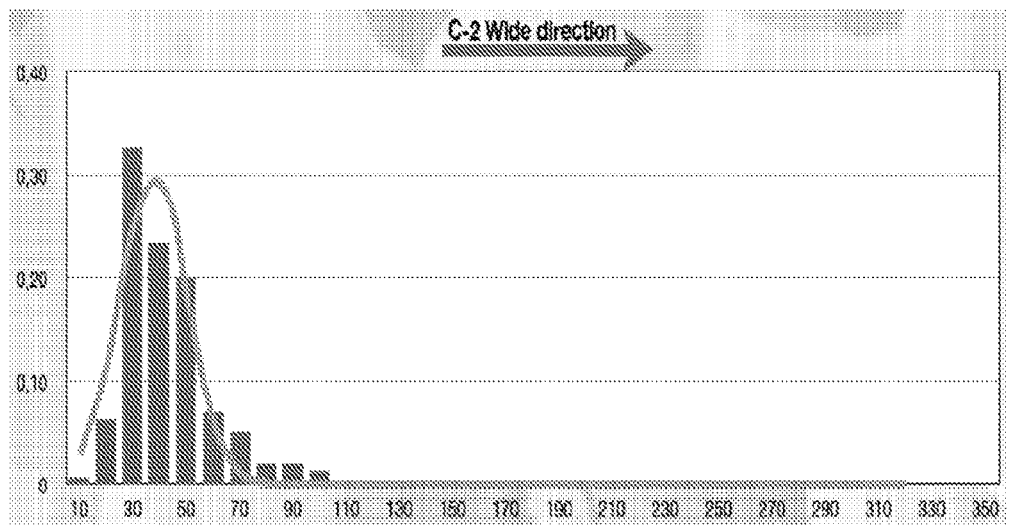
FIG. 4 is a graph showing the cell size distribution of the foam in FIG. 2.

The monomodal polymeric foams in accordance with the invention exhibit particular cell morphologies that include parameters such as cell mean size, cell density, cell size distribution, cell wall thickness, open/closed cell ratio and cell shape. Among these cell morphology parameters, cell mean size and cell wall strength are key parameters that primarily determine the physical properties of these foams. FIG. 1 is a scanning electron micrograph (SEM) image at 200 times magnification of a typical XPS foam nucleated with a conventional additive, i.e. talc at 0.6% by weight. FIG. 2 is a scanning electron micrograph (SEM) image at 400 times magnification of an XPS foam nucleated with a preferred embodiment clay, i.e. sepiolite at 0.2% by weight. A comparison between these micrographs reveals that the overall appearance of the structure and physical aspects of cells formed using a preferred clay nucleating agent is at least equivalent to the structure and aspects of cells formed using conventional talc, but with the sepiolite foam having cells with diameter of smaller size. This difference in cell size is apparent when comparing the plots of cell size distribution between FIG. 3 (talc) and FIG. 4 (sepiolite). In both FIGS. 3 and 4, the X axis is the measurement (in microns) of the diameter of the cells at the widest cross-section. The Y axis is the percentage of the number of cells within each size. FIG. 3 is a plot of the cell size distribution of the talc foam of FIG. 1 showing a distribution curve centering approximately at 120 microns. FIG. 4 is a plot of the cell size distribution of the sepiolite foam of FIG. 2 showing a distribution curve centering approximately at 40 microns. Apparent from this comparison is that the sepiolite foam of FIG. 2 has a narrower range of cell size diameters.

Foams with a multimodal cell size distribution (i.e., two or more peaks revealed in a plot of percentage of total number of cells versus cell size) are sometimes proposed as offering performance advantages such as greater toughness. The technology utilized in the present invention is different in that it achieves better performance in monomodal foams through the introduction of sepiolite-types clay to produce a reinforcement effect, improvement of the cellular structure in terms of reduction of the average cell size, generation of a more homogenous cellular structure, and increase of the anisotropy in the gravity direction. While not being bound to any particular theory, it is believed that the reinforcement effect is realized because the sepiolite-type clay is dispersed in the polymeric cell walls of the foam, thus adding structural support and reinforcing qualities to the monomodal foam.

In another aspect of the present invention, sepiolite-type particles and a related extrusion process are utilized for controlling the cell size and particularly, the mechanical properties of the cell walls. Conventional polymer foams typically exhibit a mean cell size in the 100 to 300 micron range. By utilizing the preferred embodiment clay particles and other features of the present invention, it is possible to manufacture polymer foam structures having a mean cell size in the range of a few tens of microns to several hundred microns, e.g. from about 10 microns to about 400 microns.

The sepiolite-type group clays utilized in manufacturing polymer foams according to the present invention are preferably included in the polymer matrix in a concentration from about 0.01% to about 40%, by weight more preferably from about 0.01% to about 5.0% by weight, and more preferably, from about 0.10% to about 2.0% by weight of the polymer. These amounts are referred to herein as "effective amounts" of the clay particles.

In addition to the previously noted clay materials, also known as hormite, in the present invention, combined use may be made of wollastonite based fibrous-shaped calcium silicates such as nekoite, okenite, xonotlite, faujasite and hillebrandite. The hormite, which is useful in the present invention, is a general term for fibrous clay minerals having a large number of active hydroxyl groups on the surface, and is typically referred to as "mountain leather", "mountain cork", "mountainwood", etc., which include sepiolite and palygorskite.

It will be appreciated that layered talc minerals may be included in addition to, or in combination with the preferred clays, and such embodiments are considered to be within the purview of this invention.

The shape of the cell size controlling agent is typically a needle-shaped clay particle. The preferred embodiment clay nucleating agents can also be used in combination with other known nucleating agents such as, but not limited to, talc, porous minerals such as a zeolite, wollastonite, diatomaceous earth, a molecular sieve material, or combinations thereof. These other known nucleating agents are referred to herein as "secondary nucleating agents."

Polymers

Any appropriate thermoplastic or thermoset polymer may be used in forming the monomodal polymeric composite foam. When a thermoplastic polymer is use, it is preferred that the polymer is selected from the group consisting of polystyrene, polyethylene, polypropylene, ethylene vinyl acetate (EVA), maleic anhydride grafted polymers, polyethylene terephthalate, poly(methyl methacrylate) (PMMA), polyamide, polyesters, polycarbonate, styrene butadiene copolymers, acrylonitrile butadiene styrene, styrene acrylonitrile, styrene block copolymers, ethylene methyl acrylate copolymers, polyacrylonitriles, polyurethane, polyvinyl chloride, polyvinyl alcohol, melamine formaldehyde, urea formaldehyde, polymethyleneurea, natural rubber, synthetic rubber, elastomers, biodegradable polymers and mixtures thereof. Polystyrene is particularly preferred. In the event that a thermoset polymer is used, the thermoset polymer is preferably selected from the group consisting of unsaturated polyesters, polyurethanes, amino resins, alkyd resins, phenolic resins, epoxy resins, isocyanate resins, isocyanurate resins, polysiloxane resins, and mixtures thereof. However, it will be appreciated that nearly any thermoplastic or thermoset polymer, or combination thereof may be used.

Biodegradable foams have found applications in many areas such as insulation, cushioning, load bearing, food packaging or biomedical. Biodegradation can be considered as an alternative way to reduce the environmental pollution impact generated by conventional foams such as XPS foams. Biodegradable foams can be produced by the use of biopolymer-based materials. These biopolymer-based materials include polymers such as starch, polyhydroxyalkanoates such as poly(3-hydroxybutyrate) (PHB), polyethylene adipate, poly(lactic acid) (PLA) and polycaprolactone (PCL). These materials are expected to speed up the biodegradability of conventional foams in biologically active environments like sewage, soil, and marine locations where bacteria are active. Due to their biodegradable nature, PHB and its copolymers have received attention in the areas of biomedical applications such as sutures and artificial skins, as well as controlled drug release. The present invention includes the use of one or more biodegradable polymers in a polymeric composite foam.

In the event that a thermoplastic polymer is incorporated into the polymer foam, then the sepiolite-type clays used as nucleating agents can be either dry or pre-wetted with water. Additionally, any one or more blowing agents used to form the monomodal polymeric foam are to be substantially free of water. That is, the blowing agents do not contain water in any significant amount that has been intentionally added.

In the event that the polymer foam is substantially free of, or excludes, a thermoplastic polymer, then the sepiolite-type clays used as nucleating agents can be either dry or pre-wetted with water. In this situation, water can, but is not required to be, used as a blowing agent. When water is used as a blowing agent, it can be combined with other blowing agents.

Clays and Flame Retardants

The nucleating agents of the present invention can be used advantageously in conjunction with flame retardant additives. These additives are added as such to the polymeric composition but not as a previous surface modification of the sepiolite-type clays. Examples of flame retardant additives include halogenated flame retardants of the aromatic, aliphatic and cycloaliphatic families, such as tetrabromobisphenol A (TBBPA) and its derivatives, decabromodiphenyl ether (DBDPE), hexabromocyclododecane (HBCD), chlorinated paraffins and halogenated phosphates. Polymeric halogenated additives can also be used.

The nucleating agents of the present invention can also be used advantageously with halogen-free flame retardant additives such as aluminum trihydroxide or magnesium hydroxide, boron compounds such as boric acid or sodium borate, zinc compounds such as zinc borate, zinc stannate, and zinc hydroxy-stannate, and combinations thereof.

Other flame retardant additives that can be used in conjunction with halogenated compounds, halogen-free compounds, or used by themselves, are the family of phosphorus compounds which may be any organic compound which contains one or more phosphorus atoms and includes, but is not limited to, phosphates of the formula $(RO)_3PO$ wherein each R is independently selected from a substituted or unsubstituted, saturated or unsaturated, branched or straight-chain aliphatic moiety or a substituted or unsubstituted aromatic moiety. Suitable phosphates include, but are not limited to, triphenylphosphate (TPP), tributylphosphate, triethylphosphate, trimethylphosphate, tripropylphosphate, tri-octylphosphate, diphenyl cresylphosphate, diphenyl methylphosphate, tris-(2-ethylhexyl)phosphate, isodecyl diphenylphosphate, isooctyl diphenylphosphate, bisphenyl diphenylphosphate, trixylil phosphate, triisopropylphenylphosphate, and combinations thereof. Additional examples of suitable phosphorus compounds include red phosphorus, ammonium polyphosphate, and phosphate esters. Other phosphorus compounds suitable for use in the present invention are phosphites of the formula $(RO)_3P$, phosphonates of the formula $(RO)_2RPO$, phosphinates of the formula $(RO)R_2PO$, phosphine oxides of the formula $R_3PO$, phosphines of the formula $R_3P$, and phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion, such as chloride or bromide. Phosphorus-sulfur combinations can also be used such as those based on mixtures of organophosphorus compounds and oligo or polysulfide synergists. Combinations of any of these compounds can be used. These compounds can have different kinds of substituents, can be saturated or unsaturated, branched or straight-chain aliphatic moiety or a substituted or unsubstituted aromatic moiety, depending on the final needs and the polymeric matrix. Of the previously described phosphorus compounds, phosphates are preferred and TPP and TCPP are especially preferred.

The phosphorus compound is present in the polymer foam, and preferably styrene polymer foam, in an amount from about 0.1% to about 20.0% by weight based on 100% of the styrene polymer, with about 0.5% to about 10.0% by weight being preferred, and about 1.0% to about 5.0% by weight being more preferred.

In addition, various nitrogen-based flame retardants such as melamine, melamine cyanurate and other melamine salts can be used.

The use of the preferred clay in a fire retardant formulation allows the use of less flame retardant additive while maintaining a high level of fire resistance. Because a lower level of flame retardant (lower Br content) is utilized, the foams of the present invention do not suffer from poor structural qualities and/or skin qualities. Furthermore, the use of such a fire retardant composition allows production of foams with a lower foam density, thus achieving appreciable cost savings.

Particularly preferred halogenated flame retardant additives are brominated flame retardant additives such as, but not limited to tris(tribromoneopentyl) phosphate, tetrabromobisphenol A (2,3-dibromopropyl ether), and hexabromocyclododecane (HBCD).

The brominated/sepiolite combinations are often effective at low concentrations, especially when the sepiolite-type clays have been pre-wetted with water. The brominated/sepiolite and the brominated/pre-wetted sepiolite combinations are more effective, on the basis of the weight of bromine in the extruded polymer foam, than brominated additives used in combination with non-sepiolite-type clays.

The combination of brominated compounds and sepiolite nucleating agent provides excellent flame retardant properties to combustible polymers, as indicated by various standard tests. Flame retardant properties are considered to be imparted to a combustible organic composition if any one or more of the following criteria are met: (1) an increase in Limiting Oxygen Index (LOI) of at least 0.5 units as determined in accordance with ISO 4589 or ASTM D2863, relative to an otherwise like composition that does not contain a flame retardant; and (2) a "pass" rating, together with a reduction in flame height, flame extinction time and/or formation of burning droplets as determined according to common flame tests such as for example DIN 4102 part 1, NF-P 92/501/4/5, SIA 183 and EN ISO 11925-2. The amount of flame retardants used to achieve these criteria are considered to be "effective amounts."

Clays and Blowing Agents

While not being bound to any particular theory, it is believed that the described nucleating agents use their unique surface areas and porosity characteristics as adsorbing sites for the blowing agents described herein. It is believed that the adsorbed blowing agents are carried by the porous nucleating agents into the resins and thereby improve their miscibility or solubility in the polymeric resin matrix.

Supercritical carbon dioxide is frequently used as a blowing agent due to several advantages it exhibits at the supercritical state as compared to traditional blowing agents. At its supercritical state, the temperature of carbon dioxide is 31° C. and pressure is 73.8 bar or 1074 psi. $CO_2$ can reduce the viscosity and surface tension of polymer melts, which thereby promotes many polymer processing operations. Also, carbon dioxide is low cost, non flammable, environmentally friendly and chemically benign.

An important difficulty in the use of $CO_2$ as a blowing agent is the low solubility of $CO_2$ in most polymer melts. For example, the solubility of $CO_2$ in polystyrene is only about 3.5% at 150° C. and 10 MPa pressure. However, a solubility of 5% to 6% is required to achieve the necessary cell growth.

Previous investigations have analyzed adsorption isotherms on sepiolite after heat treatment at 110° C. Some artisans have analyzed the changes in surface area of sepiolite and they found that at 110° C., adsorption volumetry provides a surface area of 340 $m^2/g$ and that molecules like $CO_2$, $N_2$ or $NH_3$ can penetrate into the channels. Additional artisans have found that more $CO_2$ was absorbed by filled polymers due to the accumulation of the gas on the filler—polymer interface, which helps in creating more nucleation sites. The present inventors have verified that this property has important implications since it facilitates the diffusion and distribution of $CO_2$ into the polymer mass to be foamed. The presence of sepiolite produces an increase in $CO_2$ absorption when compared to talc, and this behavior is reflected in a lower foam density and a higher foaming capacity for $CO_2$.

The preferred embodiment foams also typically include one or more blowing agents, selected from: 1) organic blowing agents such as aliphatic hydrocarbons having 1-9 carbon atoms including, for example, methane, ethanol, ethane, propane, etc., and fully or partially halogenated aliphatic hydrocarbons having 1-4 carbon atoms such as fluorocarbons, chlorocarbons and chlorofluorocarbons; 2) inorganic blowing agents such as carbon dioxide and/or nitrogen, wherein when the polymeric foam is substantially free of thermoplastic polymers, water can be used as a blowing agent; 3) chemical blowing agents such as azodicarbonamide, citric acid, sodium bicarbonate and other types which are known to those skilled in the art; and any combination of 1), 2), and/or 3). These blowing agents maintain the monomodal cell structure of the present subject matter foams.

Clays and Other Additives

In addition to the nucleating agents of the present invention, other additives may optionally be included in the polymer composition. Typical additives include aging modifiers, such as glycerol monostearate, lubricants, pigments and colorants, heat stabilizers, antioxidants, other flame retardants besides those noted herein, ultraviolet stabilizers, coupling agents, fillers, acid scavengers, preservatives, plasticizers, impact modifiers, chain extenders, carbon-carbon (C—C) initiators and peroxides, mold release lubricants, antistatic agents, biocides, blowing agents and the like. Other additives which can be used in combination with the nucleating agent(s) include graphite and graphene, which improve the infrared reflectivity and insulation properties of foamed sheets.

Other additives which can be used in combination with the nucleating agent(s) of the present invention include hydrophilic agents such as alkyl sulfonates and the like, including alkane sulfonate, which are commonly used in food packaging applications such as foamed trays, lunch boxes (hinged), instant noodle containers, clamshells and bowls.

Additional Aspects

Figure 5:
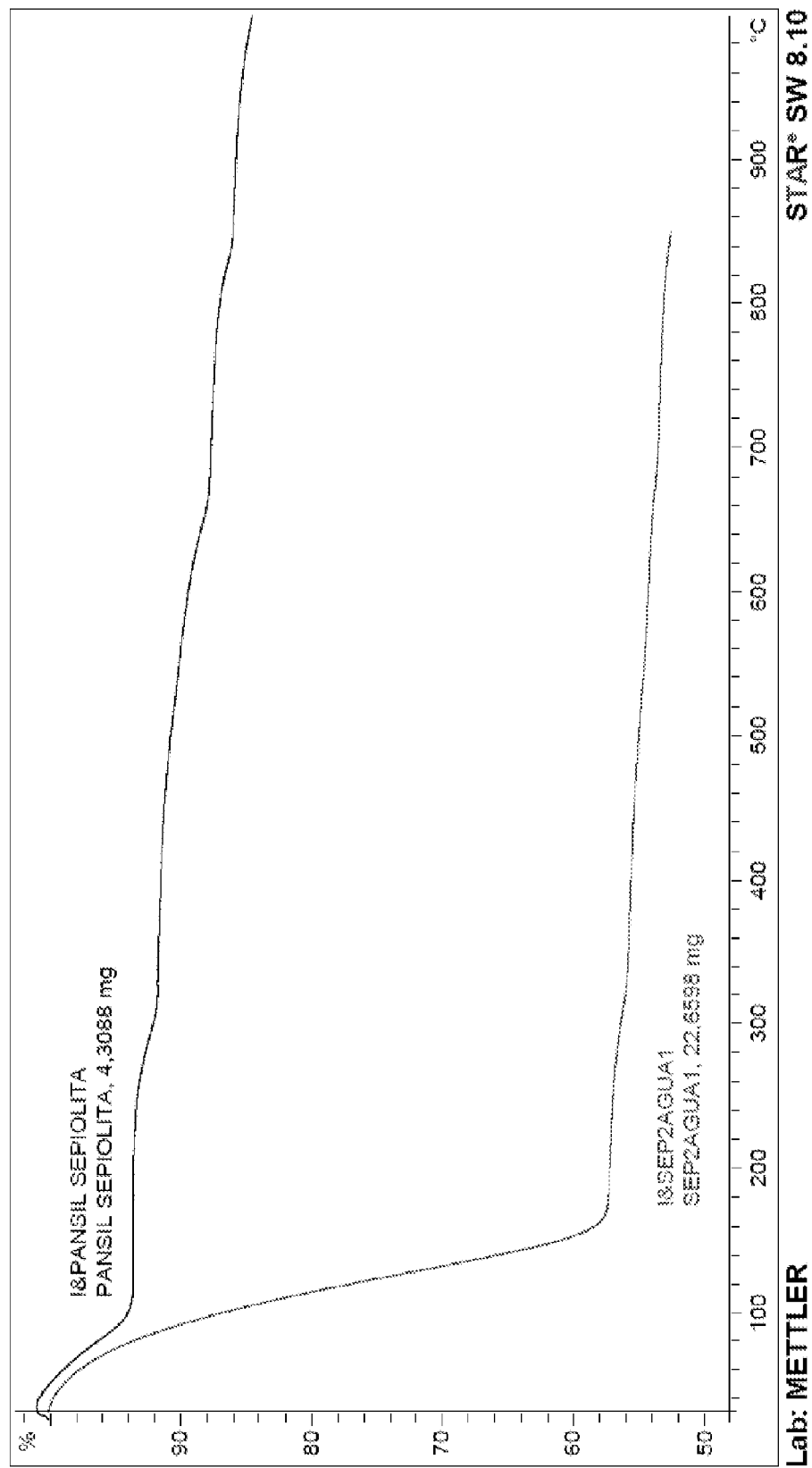
FIG. 5 is a thermogram of pristine and prewetted sepiolite.
Figure 6:
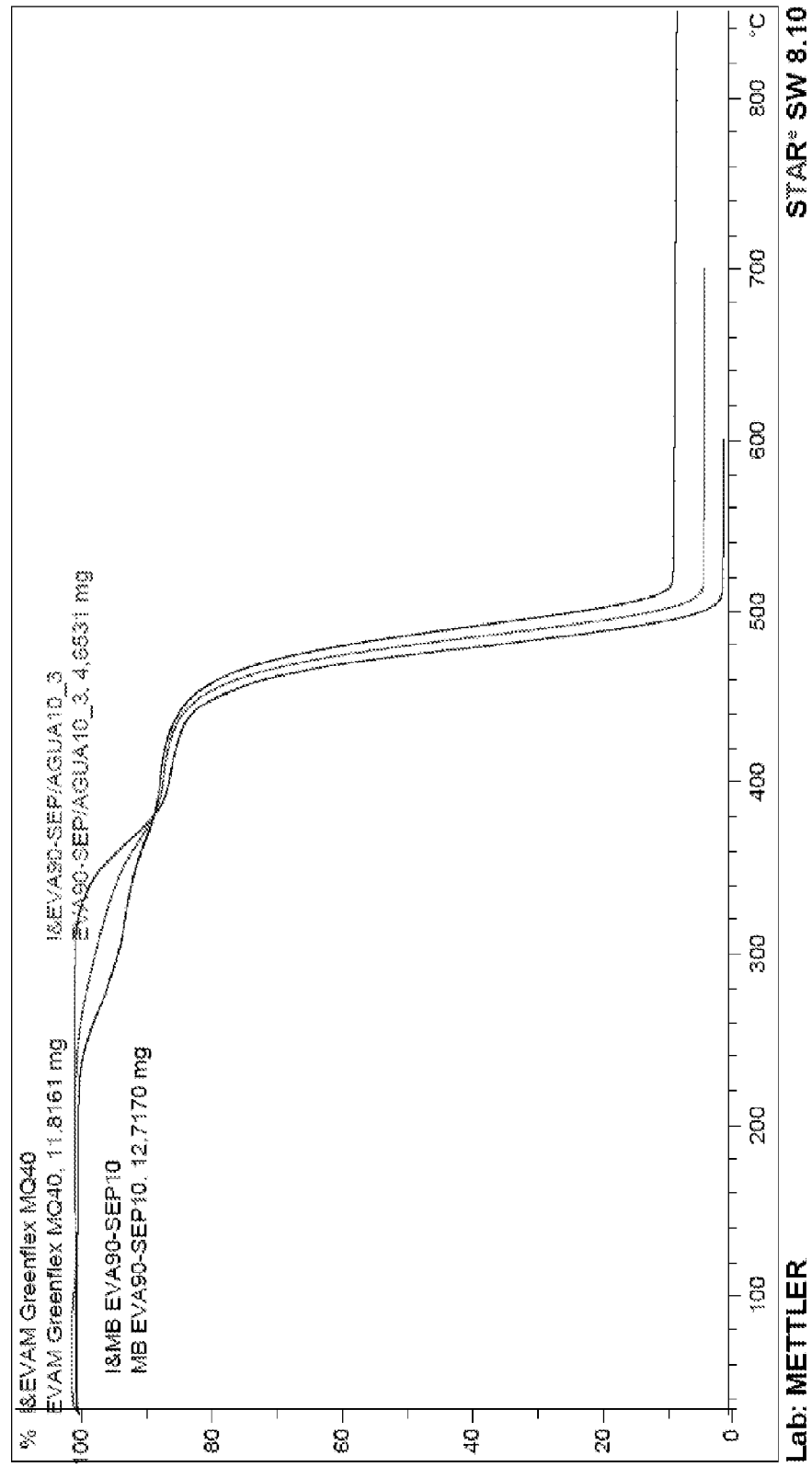
FIG. 6 is a thermogram of an EVA-based thermoplastic concentrate containing 10% by weight of pre-wetted sepiolite.

Sepiolite-type clays can be previously and intentionally pre-wetted with water in order to saturate the nanometric channels. By "pre-wetted" it is meant that the dry sepiolite-type clays are mixed with water to saturate the nanometric channels prior to adding them to a carrier or polymer matrix. The pre-wetted clay provides synergy with flame retardant systems yet still produces a monomodal polymeric foam. FIG. 5 illustrates a thermogravimetric analysis (TGA) plot of pre-wetted sepiolite that incorporates approximately 40% water. The sepiolite was obtained from Tolsa, S.A. under the trade mark PANSIL. Surprisingly, it has been discovered that a concentrate of pre-wetted sepiolite can be produced on an ethylene vinyl acetate (EVA) carrier. This polymer encapsulates the sepiolite so that it can retain water up to a high temperature, as shown in FIG. 6. This EVA/pre-wetted sepiolite combination has an excellent thermal stability, as determined by TGA. This combination exhibits a 1% weight loss at temperatures well in excess of 200° C., and typically up to approximately 250° C. This temperature is generally higher than the temperature at which a combustible polymer is melt-processed into an article such as a foam, extruded part, molded part, or the like.

Exemplary embodiments of polymer foams manufactured according to the present invention exhibit densities of from about 10 to about 500 $Kg/m^3$, but will more preferably have densities of from about 20 to about 60 $Kg/m^3$. The polymer foams manufactured according to the present invention may have structures exhibiting both closed cells and open cells.

Methods

The present invention also provides processes for forming a polymeric composite foam. A preferred process comprises heating a polymer to an adequate range of temperatures to form a polymer melt/matrix. The process also comprises incorporating an effective amount of clay particles into the polymer melt. The process further comprises introducing at least one blowing agent into the polymer matrix at elevated pressures. The process additionally comprises incorporating other optional additives such as flame retardants and colorants into the polymer matrix. The process further comprises extruding and processing the mixture so as to produce a desired cell morphology, thereby forming a monomodal polymeric composite foam. The particles are sepiolite-type clays as described herein.

Incorporating and dispersing clay particles into a polymeric mixture or melt can be undertaken in a variety of different techniques. Generally, any method which can be used to apply shear to a flowable mixture or any polymer melt can be used to disperse a preferred nucleating agent such as sepiolite into the polymer matrix. The shearing action can be provided by any appropriate method, as for example by mechanical means, by thermal shock, by pressure alteration, or by ultrasonic techniques. Methods useful in shearing melts are known in the art. In particularly useful procedures, the flowable polymer mixture is sheared by mechanical methods in which portions of the melt are caused to flow past other portions of the mixture by use of mechanical means such as stirrers, Banbury type mixers, Brabender type mixers, long continuous mixers, and extruders.

Another application of this invention is the production of microbeads for Expanded Polystyrene (EPS) through extrusion technologies. In this case sepiolite-type clay is dispersed in the polymer melt (normally as a masterbatch). The blowing agent is injected into the polymer matrix in liquid form and at high pressure and dissolved. The dispersing, dissolving and cooling stages are all carried out in static mixing equipment of proprietary design, and the cooled, highly viscous mixture is then pelletized in an underwater pelletizing system.

One exemplary embodiment of the present invention provides a process for forming a rigid monomodal polymer foam having a median cell size substantially smaller than the median cell size obtained when using talc. The rigid polymer foam is produced by incorporating an effective amount of a preferred embodiment sepiolite-type clay nucleating agent(s) therein. Conventional foams tend to have a median cell size of more than 100 microns, produced by using conventional inorganic nucleating agents such as hydrophilic talc. The rigid monomodal foams prepared according to this embodiment exhibit an improvement in compressive strength of around 30%.

Another exemplary embodiment of the present invention provides a process for producing rigid monomodal foams having a higher initial value of compressive strength when compared with foams obtained using conventional hydrophilic talc.

Yet another exemplary embodiment of the present invention is the improvement in the mechanical properties across the walls in a monomodal foamed cellular material.

As discussed herein, while not being bound to any particular theory, it is believed that the improvement in compressive strength and mechanical properties of the foam is realized because the sepiolite-type clay is dispersed in the polymeric cell walls of the foam, thus adding structural support and reinforcing qualities to the monomodal foam.

Masterbatches

In a further aspect, the present invention is directed to a highly-loaded masterbatch, also known as a concentrate composition, wherein the masterbatch comprises sepiolite-type clay that is either dry or pre-wetted with water, a carrier, and optionally other additives. As discussed further herein, the masterbatch concentrate composition is to be combined with a polymer matrix to be foamed. The invention is also directed to processes for forming such masterbatch compositions by combining these agents and mixing or otherwise extruding the polymer composition. While "carrier" is normally understood to comprise a thermoplastic or thermoset polymer, the present invention is not limited to such and further contemplates using any vehicle that provides adequate dispersion of the sepiolite-type clays in a polymer matrix to be foamed.

A typical thermoplastic formulation of a masterbatch useful for the present invention includes from about 5% to about 70% by weight of sepiolite-type clay dispersed in a thermoplastic polymer carrier. In addition, the masterbatch may contain conventional cell regulators and other additives such as secondary nucleating agents, blowing agents, dyes, pigments, lubricants, flame retardants, antistatic agents, biocides, aging modifiers, heat stabilizers, antioxidants, ultraviolet stabilizers, coupling agents, fillers, acid scavengers, preservatives, plasticizers, impact modifiers, chain extenders, carbon-carbon (C—C) initiators and peroxides, graphite, graphene, hydrophilic agents, or combinations thereof.

Preferred illustrative examples of thermoplastic carriers include but are not limited to polystyrene, polyethylene, polypropylene, ethylene vinyl acetate (EVA), maleic anhydride grafted polymers, polyethylene terephthalate, poly (methyl methacrylate) (PMMA), polyamide, thermoplastic polyesters, polycarbonate, styrene butadiene copolymers, acrylonitrile butadiene styrene, styrene acrylonitrile, styrene block copolymers, ethylene methyl acrylate copolymers, polyacrylonitriles, polyurethanes, polyvinyl chloride, polyvinyl alcohol, natural rubber, synthetic rubber, elastomers, biodegradable polymers, and mixtures thereof. Once formed, the thermoplastic masterbatch concentrate (including the carrier polymer, the sepiolite-type clay, and other additives) is mixed into a polymer matrix to be foamed. One or more blowing agents are introduced into the polymer matrix and processed to form a monomodal polymer foam. The polymer matrix to be foamed and the thermoplastic carrier polymer of the masterbatch can be, but do not have to be, the same.

In the event that a thermoset polymer is to be foamed, the present invention is directed to a process for making a highly-loaded paste composition, wherein the paste comprises sepiolite-type clay, a liquid carrier, and optionally other additives discussed herein. The liquid carrier is preferably a thermoset polymer. The thermoset polymer is preferably selected from the group consisting of unsaturated polyesters, polyols, polyurethanes, amino resins, alkyd resins, phenolic resins, epoxy resins, isocyanate resins, isocyanurate resins, polysiloxane resins, and mixtures thereof.

A typical formulation of a thermoset paste useful for the present invention includes from about 5% to about 70% by weight of sepiolite-type clay dispersed in a thermoset polymer carrier. In addition, the paste may contain conventional cell regulators and other additives such as secondary nucleating agents, blowing agents, dyes, pigments, lubricants, flame retardants, antistatic agents, biocides, aging modifiers, heat stabilizers, antioxidants, ultraviolet stabilizers, coupling agents, fillers, acid scavengers, preservatives, plasticizers, impact modifiers, chain extenders, carbon-carbon (C—C) initiators and peroxides, graphite, graphene or hydrophilic agents.

In the event that a thermoplastic polymer is incorporated into the concentrate composition or the polymer matrix to be foamed, then any one or more blowing agents used to form the monomodal polymeric foam are to be substantially free of water. That is, the blowing agents do not contain water in any significant amount that has been intentionally added.

In the event that the concentrate composition or the polymer matrix to be foamed is substantially free of a thermoplastic polymer, then water can, but is not required to be, used as a blowing agent. When water is used as a blowing agent, it can be combined with other blowing agents Using the masterbatch of the subject invention offers a number of advantages in the preparation of foams. The masterbatch allows for easy mixing with the polymer(s) matrix to be foamed, and it allows for direct addition using conventional proportioning equipment. The additives and blowing agents are very homogeneously dispersed and distributed in the polymer carrier as reflected by a highly uniform cell structure in the resulting foam.

The preparation of the masterbatch is preferably performed by homogeneous mixing of the components in a melt of the polymer carrier using conventional mixing equipment, for example in an extruder, and by reducing the mixture in size, for example by means of hot die face cutting of the extruded material followed by cooling.

A variety of processes for producing masterbatches are known and the following processes are standard in the production of the masterbatches: a) the mixing of a suitable carrier with the additives; b) extrusion and kneading with subsequent grinding of the masterbatch; or c) extrusion and subsequent fine spraying, hot chopping, or strand pelletizing of the masterbatch concentrate.

Dispersion of the concentrate composition into the polymer matrix to be foamed is carried out using equipment whose performance is based on high shear, impact and/or cavitation forces. Various types of dispersion equipment based on batch or continuous operation may be used such as but not limited to impact, ball, pebble, sand, bead, roller, or colloid mills; attritors, turbo mixers, high-speed disk dispersers etc.

Once formed, the concentrate composition (including the liquid carrier, the sepiolite-type clay, and other additives) is mixed into a polymer matrix to be foamed. If not already introduced into the thermoset paste composition, one or more blowing agents are introduced into the polymer matrix and processed to form a monomodal polymer foam. The polymer matrix to be foamed and the carrier polymer of the masterbatch paste composition can be, but do not have to be, the same.

In other additional embodiments, the masterbatches can be color masterbatches and include one or more color pigment(s) or combination of pigments.

Nonlimiting examples of such pigments include but are not limited to the inorganic pigments listed in Table 3 and the organic (or biological origin) pigments listed in Table 4.

TABLE 3

| Inorganic Pigments | |
|---|---|
| Blue Pigments | Ultramarine: a complex naturally occurring pigment of sulfur-containing sodio-silicate ($Na_{8-10}Al_6Si_6O_{24}S_{2-4}$) Cobalt Blue: cobalt ((II) aluminate, $CoAl_2O_4$. |
| Green Pigments | Cadmium Green: a light green pigment consisting of a mixture of Cromium Yellow (CdS) and Viridian ($Cr_2O_3$) Chrome Green: $Cr_2O_3$ |
| Yellow Pigments | Cadmium Yellow: cadmium sulfide (CdS) Chrome Yellow: natural pigment of lead(II) chromate ($PbCrO_4$) Yellow Ochre: a naturally occurring clay of hydrated iron oxide ($Fe_2O_3 \cdot H_2O$) Titanate Yellow: mixed metal oxides Bismuth Vanadate: $BiVO_4$ (PY 184) |
| Orange Pigments | Cadmium Orange: an intermediate between cadmium red and cadmium yellow: cadmium sulfoselenide Chrome Orange: a naturally occurring pigment mixture composed of lead(II) chromate and lead(II) oxide ($PbCrO_4$ + PbO) |
| Red Pigments | Cadmium Red: cadmium selenide (CdSe) Oxide Red: anhydrous $Fe_2O_3$ Red Lead: lead tetroxide, $Pb_3O_4$ |
| Brown Pigments | Iron oxide brown Zn/Fe mixed metal oxide: PBr31 |
| Black Pigments | Carbon pigments: Carbon Black, Ivory Black, Vine Black, Lamp Black Iron Pigments: $Fe_3O_4$, C.I pigment black 11 (C.I. No. 77499) Mixed metal oxides |

TABLE 3-continued

| Inorganic Pigments | |
|---|---|
| White Pigments | Antimony White: $Sb_2O_3$ Barium sulfate Lead White $Pb(CO_3)_2 \cdot Pb(OH)_2$ Titanium White: titanium(IV) oxide $TiO_2$ Zinc White: Zinc Oxide (ZnO) |

TABLE 4

| Organic and Biological Pigments | |
|---|---|
| Biological | Alizarin (synthesized), alizarin crimson (synthesized), gamboge, cochineal red, rose madder, indigo, Indian yellow, Tyrian purple |
| Non-biological Organic | Quinacridone, phthalo green, phthalo blue, naphtol red (PR 170), dyarilides, Diketopyrrolopyrrole (PR 254), lake pigments, isoindolinone, azo pigments |

The preferred embodiment color masterbatches as described herein generally comprise from about 5% by weight to about 40% by weight of one or more coloring pigments and/or like agents.

The addition of the masterbatch to the melt-processible polymer matrix to be foamed can be accomplished by any means known in the art. It is possible to use the same methods as for preparing the masterbatch itself. It is understood that the masterbatch carrier polymer can be the same or different than the melt-processible polymer matrix to be foamed. The masterbatch composition may be introduced and processed via a batch or continuous process. In one illustrative embodiment, the masterbatch may be introduced to the melt-processible polymer matrix and processed on a rubber compounding mill, simple kneader, or in a Banbury or other internal mixer or in a mixing extruder. Alternatively, the masterbatch can be metered to the feed section of an extruder by appropriate devices. Continuous processes can be carried out, for example, in rapid mixers, single-screw extruders, twin-screw extruders, Buss kneaders, planetary roll extruders, open double-trough kneaders or rapid stirrers. Continuous processes are preferred.

Uses and Applications

The present invention will find wide application in numerous industries. Nearly any foamed polymeric structure or product may utilize one or more aspects described herein. A particularly preferred application of the invention is producing extruded polystyrene monomodal foams (XPS) such as those used in food packaging applications. For example, extruded polystyrene foams are typically used to produce trays for prepacked meat, fish, poultry, and fruit and vegetables, often with barrier and liquid absorbent properties. As will be appreciated by those skilled in the art, these foams do not include flame retardant additives. However, such foams may include hydrophilic additives such as for liquid absorbing applications. Another application for this invention is the production of microbeads for Expanded Polystyrene (EPS) through extrusion technologies.

EXAMPLES

Materials

Polystyrene resin available under the designation EDISTIR 2982 from Polimeri, of Milan, Italy with a MFI (200° C./5 Kg) equaling 25 g/10 minutes was used to prepare sepiolite concentrates by extrusion.

Ethylene vinyl acetate copolymer (EVA) available under the designation PA-540 from Repsol of Madrid, Spain was also used to prepare certain sepiolite concentrates by extrusion.

Rubber modified styrene maleic anhydride copolymer (SMA) was purchased from Nova Chemicals of Calgary, Alberta, Canada, as DYLARK 250.

Several brominated flame retardant additives were used, specifically tris(tribromoneopentyl)phosphate (CAS No. 19186-97-1), distributed by ICL Industrial Products of St. Louis, Mo., as FR-370, tetrabromobisphenol A bis (2,3-dibromopropyl ether) (CAS No. 21850-44-2), supplied by Chemtura Corporation of Middlebury, Conn., as PE-68 and hexabromocyclododecane (HBCD, CAS No. 3194-55-6), supplied by Chemtura as CD-75P.

A preferred embodiment sepiolite was obtained from Tolsa, S.A., Madrid, Spain, under the trade mark PANSIL, which is obtained from natural sepiolite by means of a particular micronization process. Other suitable grades of sepiolite are supplied by IMV, Nevada, with the trade name Sepiogel. Sepiolite-type clays are also available in high purity, modified or unmodified forms, or as rheological grades. Rheological grade sepiolite is obtained from natural sepiolite by means of particular micronization processes that substantially prevent breakage of the sepiolite fibers, such that the sepiolite disperses easily in polymer melts, and has an external surface with a high degree of irregularity, a high specific surface preferably greater than 300 $m^2/g$, and a high density of active centers for adsorption. The above-mentioned qualities of rheological grade sepiolite can also be attributed to rheological grade attapulgite with particle sizes smaller than 40 microns, such as for example the range of ATTAGEL goods manufactured and marketed by BASF, Florhan Park, N.J. 07932, and the MIN-U-GEL range of the Floridin Company of Quincy, Fla. An experimental version of sepiolite called EXP1, supplied by Tolsa, was also used which was modified organically with a phosphonium salt.

Talc 20M00S was purchased from Luzenac of Denver, Colo. Polyol 10.01 was purchased from Bayer of Pittsburgh, Pa. TDI 80/20 was purchased from Enichem Polimeri of Rome, Italy. Silicone BF2370, Tegoamin 33 and stannous octoate were all purchased from Evonik Goldschmidt of Essen, Germany.

Laboratory Scale Preparations
Laboratory Foaming of Polymer/Clay Composites.

For $CO_2$ foam extrusion, the equipment used consisted of a Dr. Collin single screw extruder with a screw diameter D=30 mm and a length to diameter ratio L/D=30. This extruder was modified for the injection of gases at high pressures. This was done by using a Teledyne Isco high precision syringe metering pump. A screw with a castellated tip mixing zone was used to facilitate mixing of the gas with the polymer melt. A capillary die with a 0.5 mm diameter and 4 mm length nozzle was custom made to generate a high and rapid pressure drop. The various investigations were performed with an extrusion speed of 10 rpm, which corresponds to an output of approximately 1.4 kg/h. The volume of $CO_2$ injected to the foam was 1.5 mL/min. The cylindrical profiles obtained were appropriate for Limiting Oxygen Index (LOI) testing.

Industrial Scale Preparations
Preparation of Polymer/Clay Concentrates

A Coperion ZSK40 twin-screw extruder was used to prepare polymer/sepiolite concentrates containing 20% sepiolite dispersed therein. Some compositions included 10% SMA (DYLARK), based on the weight of polystyrene in the masterbatch. This extrusion equipment was also used to prepare the polymer/flame retardant concentrates.

These masterbatches were subsequently blended with polystyrene and the blowing agent system, and were used by an industrial processor to prepare the final monomodal foamed composites by extrusion.

Industrial Scale Extrusion of Monomodal Foamed Polymer/Clay Composites

A typical apparatus for making the preferred foams by an extrusion process includes an extruder, a mixer, a cooler, and a die in series. Typically, the apparatus is maintained such that the feeding zone is maintained at 120° C. to 160° C., the melting zone is maintained at 150° C. to 190° C., the metering zone is maintained at 180° C. to 220° C., and the mixing zone is maintained at 180° C. to 200° C. The fire retardant is in the form of a powder or as a granulate and generally includes a styrene polymer concentrate. All solid materials are fed to the extruder, while the liquid materials can be injected directly into the mixer. The fire retardant formulation and the other additives are mixed with the styrene polymer resin in the desired ratio. The blowing agent is then incorporated into the blended polymer melt at an elevated pressure in the mixer to form a foamable gel. The temperature of the foamable gel is reduced to a suitable foaming temperature (typically about 120° C.) by reducing the temperature of the cooling zone. The foamable gel is then conveyed through the die into a region of reduced pressure to form the foam, adjusting the die opening as required and expanding the foam between substantially parallel forming plates. The monomodal foam structure is preferably closed-cell, and has a closed-cell content of at least 90 percent according to ASTM D-2856. The foam structure preferably has a density of 16 $kg/m^3$ to 80 $kg/m^3$ according to ASTM D-1622. The foam further has an average cell size of 0.05 to 2.4 mm.

Analytical Methods

Specimens from the monomodal foamed compositions were cut with a razor blade to dimensions of 100×10×5 mm and placed for 30 seconds in a container filled with liquid nitrogen. These specimens were then fractured by hand and the exposed surface was observed through a microscope after sputtering it with a gold coating of 5-7 nm thickness.

The cellular morphology was characterized by scanning electron microscopy (SEM) with a JEOL JSM-820 microscope. The mean cell size and the cell size distribution were obtained using image processing software "Image J" from at least 75 cells in different micrographs from the same specimen. This software was developed by CellMat (Condensed Matter Physics Dept, University of Valladolid, Spain).

Thermogravimetric Analysis (TGA) was carried out with a TGA/SDTA 851$^e$ from Mettler Toledo. Approximately 10 mg of the sample were analyzed under a 50 milliliters per minute (mL/min) flow of gaseous nitrogen and a heating rate of 20° C./min over a range of temperatures, typically from room temperature (nominally 30° C.) to 800° C. Sample weight and temperature were continuously monitored during the heating step. This method provides a graphical representation showing the cumulative weight loss of the sample as a function of temperature.

The Limiting Oxygen Index (LOI) was determined following UNE-EN ISO 4589-2:2001, which is equivalent to EN ISO 4589-2:1999. This part of the ISO 4589 standard establishes test methods to assess the minimum oxygen concentration, mixed with nitrogen, that will maintain a flame on vertically oriented small specimens in specific test conditions. Sample conditioning was 336 h at 23±2° C. and 50±5% R.H. The methodology used implies ignition of the upper surface of type III specimens with dimensions 10×100 mm.

The Euroclass system classifies building products into seven classes on the basis of their reaction-to-fire properties. Euroclass E generally covers products that present an acceptable reaction to fire, i.e. they can resist ignition by a small flame for a short period. A flame-spread test, performed in accordance with DIN EN 13501, is the industry standard in Europe for XPS foam slabs.

The Compression Set was determined at 70° C. on polyurethane foams according to ISO 1856.

Tear Strength was determined on polyurethane foams according to ISO 8067.

Tensile Strength and Elongation at Break were determined on polyurethane foams according to ISO 1798.

The following examples are presented to further illustrate the present invention and so as to provide those of ordinary skill in the art with a more complete disclosure and description of how the composite compositions claimed herein are made and evaluated. The following examples are not intended to limit the scope of what the inventors regard as their invention.

In Examples 1-10, flame tests were performed upon various samples formed from monomodal XPS foams produced using an industrial scale process.

Example 1

99 parts of polystyrene (all parts are parts by weight unless noted otherwise) were physically blended with 1 part of a polystyrene concentrate containing 60% talc by weight. This mixture was extruded into a foam of 40 mm thickness at an industrial XPS plant, using a combination of HCFC, alcohol and $CO_2$. This sheet did not pass the Euroclass E classification. The same blend was extruded in the laboratory into cylindrical foamed profiles using $CO_2$ and produced a LOI=18.8% $O_2$.

Example 2

99 parts of polystyrene were physically blended with 1 part of a polystyrene concentrate containing 20% sepiolite by weight. This mixture was extruded into a foam of 40 mm thickness at an industrial XPS plant, using a combination of HCFC, alcohol and $CO_2$. This sheet did not pass the Euroclass E classification. The same blend was extruded in the laboratory into cylindrical foamed profiles using $CO_2$ and produced a LOI=19.0% $O_2$. It can be observed that 0.2% sepiolite by weight gives a somewhat higher LOI than 0.6% talc by weight.

Example 3

96 parts of polystyrene were physically blended with 1 part of a polystyrene concentrate containing 60% talc by weight and 3 parts of a polystyrene concentrate containing 65% HBCD. This blend contains 1.46% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=24.6% $O_2$.

Example 4

93 parts of polystyrene were physically blended with 1 part of a polystyrene concentrate containing 60% talc by weight and 6 parts of a polystyrene concentrate containing 25% FR-370 by weight. This blend contains 1.05% bromine by weight. This mixture was extruded into a foam of 40 mm thickness at an industrial XPS plant, using a combination of HCFC, alcohol and $CO_2$. This sheet did not pass the Euroclass E classification. The same blend was extruded in the laboratory into cylindrical foamed profiles using $CO_2$ and produced a LOI=21.5% $O_2$.

Example 5

91.5 parts of polystyrene were physically blended with 1 part of a polystyrene concentrate containing 60% talc by weight and 7.5 parts of a polystyrene concentrate containing 20% PE-68 by weight. This blend contains 1.02% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=22.8% $O_2$. By comparing Examples 4 and 5 it can be concluded that, at equal bromine content, PE-68 is more effective than FR-370.

Example 6

93.5 parts of polystyrene were physically blended with 0.5 parts of a polystyrene/DYLARK concentrate containing 20% EXP1 by weight and 6.0 parts of a polystyrene concentrate containing 25% FR-370 by weight. This blend contained 1.05% bromine by weight. This mixture was extruded into a foam of 40 mm thickness at an industrial XPS plant, using a combination of HCFC, alcohol and $CO_2$. This sheet did not pass the Euroclass E classification. The same blend was extruded in the laboratory into cylindrical foamed profiles using $CO_2$ and produced a LOI=21.3% $O_2$.

Example 7

93.5 parts of polystyrene were physically blended with 0.5 parts of a polystyrene/DYLARK concentrate containing 20% PANSIL by weight and 6.0 parts of a polystyrene concentrate containing 25% FR-370 by weight. This blend contained 1.46% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=22.9% $O_2$. By comparing Examples 6 and 7 it can be concluded that Euroclass E is passed with 1.5% FR-370 by weight and 0.1% sepiolite by weight. Euroclass is not passed when the organically modified EXP1 sepiolite is used. LOI is also higher when sepiolite is not organically modified. By comparing Examples 4 and 7 it can be concluded that Euroclass is not passed and LOI is lower when 0.6% talc by weight is used instead of 0.1% sepiolite by weight.

Example 8

93.5 parts of polystyrene were physically blended with 0.5 parts of a polystyrene concentrate containing 20% PANSIL by weight and 6.0 parts of a polystyrene concentrate containing 25% FR-370 by weight. This blend contained 1.05% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=21.9% $O_2$. By comparing Examples 7 and 8 it can be concluded that Euroclass E is passed with 1.5% FR-370 by weight and 0.1% sepiolite by weight. LOI is higher when the sepiolite concentrate is prepared with a combination of GPPS and DYLARK.

Example 9

91.5 parts of polystyrene were physically blended with 0.5 parts of a polystyrene concentrate containing 20% PANSIL by weight, 0.5 parts of a polystyrene concentrate containing 60% talc by weight and 7.5 parts of a polystyrene concentrate containing 20% PE-68 by weight. This blend contained 1.02% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=23.4% $O_2$. By comparing Examples 5 and 9 it can be concluded that by replacing 0.3% talc by weight with 0.1% sepiolite by weight, a higher LOI is obtained.

Example 10

91.5 parts of polystyrene were physically blended with 1 part of a polystyrene concentrate containing 20% PANSIL by weight and 7.5 parts of a polystyrene concentrate containing 20% PE-68 by weight. This blend contained 1.02% bromine by weight. This mixture was extruded into a foam of 40 mm thickness at an industrial XPS plant, using a combination of HCFC, alcohol and $CO_2$. This sheet passed the Euroclass E classification. The same blend was extruded in the laboratory into cylindrical foamed profiles using $CO_2$ and produced a LOI=23.7% $O_2$. By comparing Examples 5 and 10 it can be concluded that Euroclass E is passed with 1.5% PE-68 by weight and 0.2% sepiolite by weight. It can be observed that 0.2% sepiolite by weight gives a higher LOI than 0.6% talc by weight.

Table 5 presents flame test results carried out on industrial-scale XPS foam slabs. A difference of more than 0.5% in % $O_2$ in VN is significant enough for demonstrating an improvement in flame retardant properties.

In Examples 11-15, pre-wetted sepiolite was used to form foamed samples. The effect of using pre-wetted sepiolite on LOI values is evident.

Example 11

97 parts of polystyrene were physically blended with 3 parts of a polystyrene concentrate containing 50% HBCD. This mixture was extruded in the laboratory into cylindrical foamed profiles using $CO_2$ and produced a LOI=22.8% $O_2$.

Example 12

97.5 parts of polystyrene were physically blended with 2.5 parts of an EVA concentrate containing 20% PANSIL. This mixture was extruded in the laboratory into cylindrical foamed profiles using $CO_2$ and produced a LOI=18.0% $O_2$.

Example 13

97.5 parts of polystyrene were physically blended with 2.5 parts of an EVA concentrate containing 20% of pre-wetted PANSIL. This mixture was extruded in the laboratory into cylindrical foamed profiles using $CO_2$ and produced a LOI=18.5% $O_2$.

Example 14

92.5 parts of polystyrene were physically blended with 5 parts of a polystyrene concentrate containing 20% PE-68 and 2.5 parts of an EVA concentrate containing 20% PANSIL. This mixture was extruded in the laboratory into cylindrical foamed profiles using $CO_2$ and produced a LOI=20.5% $O_2$.

Example 15

92.5 parts of polystyrene were physically blended with 5 parts of a polystyrene concentrate containing 20% PE-68 and 2.5 parts of an EVA concentrate containing 20% of pre-wetted PANSIL. This mixture was extruded in the laboratory into cylindrical foamed profiles using $CO_2$ and produced a LOI=21.5% $O_2$.

TABLE 5

Summary of Foamed XPS Samples of Examples 1-10

| | Example | | | | | | | | | |
|---|---|---|---|---|---|---|---|---|---|---|
| | 1 | 2 | 3 | 4 | 5 | 6 | 7 | 8 | 9 | 10 |
| GPPS EDISTIR 2982 | 99.0 | 99.0 | 96.0 | 93.0 | 91.5 | 93.5 | 93.5 | 93.5 | 91.5 | 91.5 |
| 65% HBCD by weight in GPPS | | | 3.0 | | | | | | | |
| 25% FR-370 by weight in GPPS | | | | 6.0 | | 6.0 | 6.0 | 6.0 | | |
| 20% PE-68 by weight in GPPS | | | | | 7.5 | | | | 7.5 | 7.5 |
| 20% PANSIL by weight in GPPS/DYLARK | | | | | | | 0.5 | | | |
| 20% EXP-1 by weight in GPPS/DYLARK | | | | | | 0.5 | | | | |
| 60% talc by weight in GPPS | 1.0 | | 1.0 | 1.0 | 1.0 | | | | 0.5 | |
| 20% PANSIL by weight in GPPS | | 1.0 | | | | | | 0.5 | 0.5 | 1.0 |
| Meets Euroclass E | NO | NO | YES | NO | YES | NO | YES | YES | YES | YES |
| % Br by weight in final compound | — | — | 1.46 | 1.05 | 1.02 | 1.05 | 1.05 | 1.05 | 1.02 | 1.02 |
| LOI (% $O_2$) | 18.8 | 19.0 | 24.6 | 21.5 | 22.8 | 21.3 | 22.9 | 21.9 | 23.4 | 23.7 |

Table 6 lists flame testing results for foamed samples 11-15.

TABLE 6

LOI results with pre-wetted sepiolite of Examples 11-15

| | Example | | | | |
|---|---|---|---|---|---|
| | 11 | 12 | 13 | 14 | 15 |
| GPPS EDISTIR 2982 | 97.0 | 97.5 | 97.5 | 92.5 | 92.5 |
| 50% HBCD in GPPS | 3.0 | | | | |
| 20% PE-68 in GPPS | | | | 5.0 | 5.0 |
| 20% PANSIL in EVA | | 2.5 | | 2.5 | |
| 20% pre-wetted PANSIL in EVA | | | 2.5 | | 2.5 |
| LOI (% $O_2$) | 22.8 | 18.0 | 18.5 | 20.5 | 21.5 |

In Examples 16-19, investigations were undertaken to determine compressive strength values of foamed XPS samples.

Example 16

96 parts of polystyrene were physically blended with 1 part of a polystyrene concentrate containing 60% talc by weight and 3 parts of an EVA concentrate containing 50% PE-68 by weight. This mixture was extruded into a foam of 40 mm thickness at an industrial XPS plant, using a combination of HCFC, alcohol and $CO_2$. This mixture was also extruded in the laboratory into cylindrical foamed profiles using $CO_2$. The industrial foamed XPS sheets gave a compressive strength of 182 kPa. The average cell size was 195 microns.

Example 17

96 parts of polystyrene were physically blended with 0.5 parts of a polystyrene/DYLARK concentrate containing 20% PANSIL by weight and 3 parts of an EVA concentrate containing 50% PE-68 by weight. This mixture was extruded into a foam of 40 mm thickness at an industrial XPS plant, using a combination of HCFC, alcohol and $CO_2$. This mixture was also extruded in the laboratory into cylindrical foamed profiles using $CO_2$. The industrial foamed XPS sheets gave a compressive strength of 230 kPa. The average cell size is 168 microns.

Example 18

96.5 parts of polystyrene were physically blended with 1 part of a polystyrene/DYLARK concentrate containing 20% PANSIL by weight and 3 parts of an EVA concentrate containing 50% PE-68 by weight. This mixture was extruded into a foam of 40 mm thickness at an industrial XPS plant, using a combination of HCFC, alcohol and $CO_2$. This mixture was also extruded in the laboratory into cylindrical foamed profiles using $CO_2$. The industrial foamed XPS sheets gave a compressive strength of 236 kPa. The average cell size was 143 microns.

Example 19

96.5 parts of polystyrene were physically blended with 0.5 parts of a polystyrene/DYLARK concentrate containing 20% PANSIL by weight, 0.5 parts of a GPPS concentrate containing 60% talc by weight and 3 parts of an EVA concentrate containing 50% PE-68 by weight. This mixture was extruded into a foam of 40 mm thickness at an industrial XPS plant, using a combination of HCFC, alcohol and $CO_2$. This mixture was also extruded in the laboratory into cylindrical foamed profiles using $CO_2$. The industrial foamed XPS sheets gave a compressive strength of 283 kPa. The average cell size was 121 microns.

Table 7 presents compressive strength testing results which are described in detail in Examples 16-19.

TABLE 7

Compressive Strength Results on Industrial-Scale XPS Foam Slabs of Examples 16-19

| | Example | | | |
|---|---|---|---|---|
| | 16 | 17 | 18 | 19 |
| GPPS EDISTIR 2982 | 96.0 | 96.0 | 96.5 | 96.5 |
| 50% PE-68 by weight in EVA | 3.0 | 3.0 | 3.0 | 3.0 |
| 60% talc by weight in GPPS | 1.0 | | | 0.5 |
| 20% PANSIL by weight in GPPS/DYLARK | | 0.5 | 1.0 | 0.5 |
| Compressive strength @ 10% (kPa) | 182 | 230 | 236 | 283 |
| Average cell size (microns) | 195 | 168 | 143 | 121 |

In Examples 20-22, flexural modulus of various foamed samples was measured.

Example 20

99 parts of polystyrene were physically blended with 1 part of a polystyrene concentrate containing 60% talc by weight. This mixture was extruded into a foam of 40 mm thickness at an industrial XPS plant, using a combination of HCFC, alcohol and $CO_2$. The industrial foamed XPS sheets gave a flexural modulus of 295 KPa (43 psi).

Example 21

99 parts of polystyrene were physically blended with 1 part of a polystyrene/DYLARK concentrate containing 20% PANSIL by weight. This mixture was extruded into a foam of 40 mm thickness at an industrial XPS plant, using a combination of HCFC, alcohol and $CO_2$. The industrial foamed XPS sheets gave a flexural modulus of 362 KPa (52 psi).

Example 22

99 parts of polystyrene were physically blended with 0.5 parts of a polystyrene/DYLARK concentrate containing 20% PANSIL by weight and 0.5 parts of a polystyrene concentrate containing 60% talc by weight. This mixture was extruded into a foam of 40 mm thickness at an industrial XPS plant, using a combination of HCFC, alcohol and $CO_2$. The industrial foamed XPS sheets gave a flexural modulus of 395 KPa (57 psi).

Table 8 lists flexural modulus values of samples from Examples 20-22.

TABLE 8

Flexural Modulus of Foamed XPS Samples

| | Example | | |
|---|---|---|---|
| | 20 | 21 | 22 |
| GPPS EDISTIR 2982 | 99.0 | 99.0 | 99.0 |
| 20% PANSIL by weight in GPPS/DYLARK | | 1.0 | 0.5 |
| 60% talc by weight in GPPS | 1.0 | | 0.5 |
| Flexural modulus (KPa/psi) | 295/43 | 362/52 | 395/57 |

In Examples 23-25, mechanical properties have been tested on various samples formed from flexible polyurethane foams produced in the laboratory. The compositions and results obtained are detailed in tables 9 and 10.

TABLE 9

Standard composition of flexible PU foam samples

| Component | Amount |
|---|---|
| Polyol 10.01 (OH = 48) | 100 |
| TDI 80/20 | 52.58 |
| Water | 4 |
| Silicone BF2370 | 1.28 |
| Tegoamin 33 (3:1 dillution in polyol) | 0.23 |
| Stannous octoate | 0.21 |
| Polyol paste with 15% Pansil/talc (1:3) by weight | variable |

TABLE 10

Mechanical properties of flexible PU foam samples

| Example | | Compression set @ 70° C. (%) | Tear strength (N/m) | Tensile strength (MPa) | Elongation at break (%) | Cells/m2 |
|---|---|---|---|---|---|---|
| Ex. 23 | Standard (STD) | 10.2 | 338 | 0.0826 | 98 | 250 |
| Ex. 24 | STD + 5% paste by weight | 6.3 | 364 | 0.0971 | 169 | 400 |
| Ex. 25 | STD + 10% paste by weight | 6.3 | 467 | 0.1140 | 223 | 450 |

Many other benefits will no doubt become apparent from future application and development of this technology.

All patents, published applications, standards or references, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous materials, methods, and applications. However, it will be appreciated that various changes in the details, materials and components, which have been herein described and illustrated in order to explain the nature of the invention, may be made by those skilled in the art without departing from the principle and scope of the invention, as expressed in the appended claims.

What is claimed is:

1. A foamable polymer composition comprising a polymeric matrix having at least one sepiolite-type clay dispersed therein, the polymeric matrix comprising at least one of i) a thermoplastic polymer and ii) a thermoset polymer;
wherein, when the polymeric matrix comprises i) a thermoplastic polymer, then the blowing agent used to form the composition into a foam is free of water;
at least one selected from the group consisting of nekoite, okenite, faujasite and hillebrandite; and
at least one blowing agent dispersed in the polymeric matrix.

2. The foamable polymer composition according to claim 1, further comprising at least one additive agent dispersed in the polymeric matrix, wherein the additive agent is selected from the group consisting of flame retardants, secondary nucleating agents, blowing agents, dyes, pigments, lubricants, antistatic agents, biocides, aging modifiers, heat stabilizers, antioxidants, ultraviolet stabilizers, coupling agents, fillers, acid scavengers, preservatives, plasticizers, impact modifiers, chain extenders, graphite, graphene, hydrophilic agents, and combinations thereof.

3. The foamable polymer composition according to claim 2, wherein the flame retardant additive is a halogenated compound, including polymeric halogenated additives.

4. The foamable polymer composition according to claim 3, wherein the halogenated compound is a bromine-containing compound.

5. The foamable polymer composition according to claim 2, wherein the flame retardant additive is a phosphorus compound and is selected from the group consisting of organophosphorus-sulfur compounds, phosphates, phosphites, phosphonates, phosphinates, phosphine oxides, phosphines, phosphonium salts, phosphorus-sulfur compounds, and combinations thereof.

6. The foamable polymer composition according to claim 1, wherein the at least one sepiolite-type clay is from about 0.01% to about 5% by weight of the polymeric matrix.

7. The foamable polymer composition according to claim 1, wherein the at least one blowing agent includes $CO_2$.

8. The foamable polymer composition of claim 1, wherein the sepiolite-type clay is attapulgite.

9. The polymer foam composition according to claim 2, wherein the at least one additive agent includes a secondary nucleating agent selected from the group consisting of talc, wollastonite, zeolite, diatomaceous earth, a molecular sieve material, and combinations thereof.

10. The foamable polymer composition of claim 2, wherein the flame retardant additive is selected from the group consisting of halogenated compounds, halogen-free compounds, phosphorus compounds, nitrogen-based compounds, polymeric halogenated additives, and combinations thereof.

11. The foamable polymer composition according to claim 4, wherein the halogenated bromine-containing compound is selected from the group consisting of tris(tribromoneopentyl)phosphate, tetrabromobisphenol A bis (2,3-dibromopropyl ether), hexabromocyclododecane (HBCD), and mixtures thereof.

12. The foamable polymer composition according to claim 1, wherein the thermoplastic polymer is selected from the group consisting of polystyrene, polyethylene, polypropylene, ethylene vinyl acetate, maleic anhydride grafted polymers, polyethylene terephthalate, poly(methyl methacrylate), polyamide, thermoplastic polyesters, polycarbonate, styrene butadiene copolymers, acrylonitrile butadiene styrene, styrene acrylonitrile, styrene block copolymers, ethylene methyl acrylate copolymers, polyacrylonitriles, polyurethanes, polyvinyl chloride, polyvinyl alcohol, melamine formaldehyde, urea formaldehyde, polymethyiene urea, natural rubber, synthetic rubber, elastomers, biodegradable polymers, and mixtures thereof.

13. The foamable polymer composition according to claim 1, wherein the sepiolite-type clays are pre-wetted with water.

14. The foamable polymer composition according to claim 1, wherein the thermoset polymer is selected from the group consisting of unsaturated polyesters, polyurethanes, amino resins, alkyl resins, phenolic resins, epoxy resins, isocyanate resins, isocyanurate resins, polysiloxane resins, and mixtures thereof.

15. The foamable polymer composition according to claim 2, wherein the additive agents includes alkyl sulfonate.

16. A method of forming a monomodal polymeric foam, the method comprising:
   incorporating sepiolite-type clay particles into a polymer matrix comprising at least one of i) a thermoplastic polymer and ii) a thermoset polymer;
   introducing at least one blowing agent into the polymer matrix;
   introducing at least one selected from the group consisting of nekoite, okenite, faujasite and hiliebrandite into the polymer matrix; and
   processing the polymer matrix with the sepiolite-type clay particles and at least one blowing agent, to thereby produce the monomodal polymeric foam;
   wherein when the polymeric matrix comprises i) a thermoplastic polymer, then the at least one blowing agent is free of water.

17. The method according to claim 16, wherein the sepiolite-type clay particles are pre-wetted with water.

* * * * *

UNITED STATES PATENT AND TRADEMARK OFFICE
CERTIFICATE OF CORRECTION

PATENT NO. : 9,873,772 B2
APPLICATION NO. : 14/653034
DATED : January 23, 2018
INVENTOR(S) : Igualada et al.

It is certified that error appears in the above-identified patent and that said Letters Patent is hereby corrected as shown below:

In the Claims

In Column 28, Line 56, Claim 12, delete "polymethyiene" and insert -- polymethylene --.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*